United States Patent [19]
Tokunaga et al.

[11] Patent Number: 4,580,130
[45] Date of Patent: Apr. 1, 1986

[54] ROTARY ENCODER

[75] Inventors: Ichiro Tokunaga; Hiroshi Matsunaga; Yoji Shimojima, all of Furukawa, Japan

[73] Assignee: Alps Electric Co., Ltd., Japan

[21] Appl. No.: 599,546

[22] Filed: Apr. 12, 1984

[30] Foreign Application Priority Data

Apr. 13, 1983 [JP] Japan ............................. 58-54119[U]

[51] Int. Cl.⁴ .............................................. G01P 13/00
[52] U.S. Cl. ............................. 340/347 SY; 324/175; 340/672
[58] Field of Search ............... 340/347 SY, 672, 671; 324/174, 175, 208; 250/231 SE

[56] References Cited

U.S. PATENT DOCUMENTS 2,926,335  2/1960  Bower ................................. 340/672
4,262,251  4/1981  Fujishiro et al. ................... 324/208
4,426,565  1/1984  Rüter ................................. 324/175

Primary Examiner—L. T. Hix
Assistant Examiner—David M. Gray
Attorney, Agent, or Firm—Guy W. Shoup

[57] ABSTRACT

A rotary encoder used for measuring the rotational velocity, for example, of a rotating disk provided with reflecting surfaces and non-reflecting surfaces which are formed alternately on its periphery with a pitch l. The encoder includes one output optical fiber and two input optical fibers. All of the fibers have their one end surfaces opposed to the periphery of the disk. The input fibers are attached to the opposite sides of the output fiber in side-by-side relation. The interval between the end surfaces of the input fibers is set equal to l (n±¼), where n is a positive integer. Light-emitting devices connected to the input fibers produce output waveforms that are 90 degrees out of phase.

2 Claims, 2 Drawing Figures

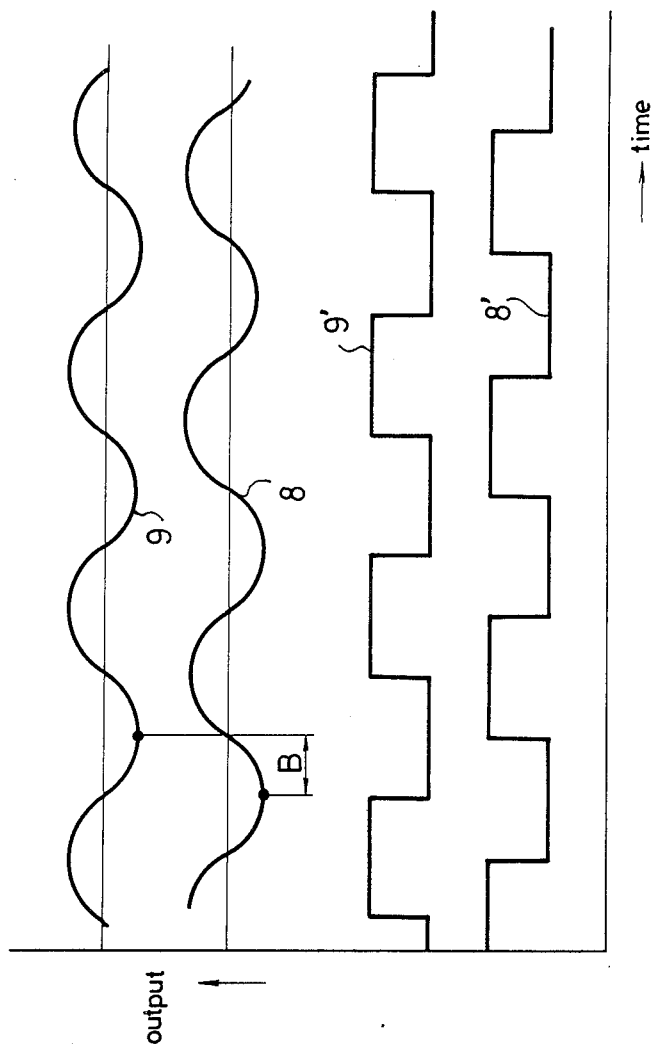

ROTARY ENCODER

FIELD OF THE INVENTION

The present invention relates to a rotary encoder and, more particularly, to a rotary encoder which has one output optical fiber and two input optical fibers to deliver two output waveforms that are 90° out of phase.

BACKGROUND OF THE INVENTION

A conventional rotary encoder for measuring the rotational velocity of a rotating disk includes an output optical fiber connected to a light-emitting device, such as a LED, and an input optical fiber connected to a light-receiving device, such as a phototransistor. These fibers are coupled together at their front ends, and one end surfaces of the fibers are disposed opposite to the periphery of the disk, so that an effective reflective region is formed below the junction of the fibers. The periphery of the disk is provided with light-reflecting surfaces and non-reflecting surfaces. When one of the reflecting surfaces enters the reflective region, the light-receiving device produces an output of a high level. On the other hand, when one of the non-reflecting surfaces is passing through the region, the device produces an output of a low level. The number of the output pulses of the high and low levels are counted during a certain time to determine the rotational velocity of the disk.

In such a rotary encoder, it would be convenient to obtain two output waveforms that are 90 degrees out of phase, for permitting detection of the direction of the rotation or an increase in the resolution in addition to the measurement of the velocity. More specifically, when the disk is reversed, the order in which these output waveforms are generated is reversed, thus allowing detection of the direction of the rotation. When the two output waveforms are summed, a large output level can be provided, even if the pitch between the neighboring reflecting and non-reflecting surfaces is minute. Hence, the output difference between the high level and the low level increases, permitting an increase in the resolution.

SUMMARY OF THE INVENTION

It is the main object of the present invention to provide a rotary encoder capable of producing two output waveforms that are 90 degrees out of phase.

This object is achieved in accordance with the teachings of the invention by providing a rotary encoder which includes one output optical fiber connected to a light-emitting device, such as a LED, and two input optical fibers connected to light-receiving devices, such as phototransistors, the input fibers being attached to the opposite sides of the output fiber in side-by-side relation. One end surfaces of these fibers are disposed opposite to the periphery of a rotary disk and aligned in the direction of rotation of the disk. The interval between the end surfaces of the two input fibers is set equal to $l(n \pm \frac{1}{4})$, where l is the pitch with which reflecting and non-reflecting surfaces are alternately formed on the periphery of the disk, and n is a positive integer.

In the rotary encoder constructed thus far described, a pair of effective reflective regions is formed below the junctions of the input and output optical fibers. When one of the reflecting surfaces on the periphery of the rotating disk enters either reflective region, the corresponding light-receiving device produces an output of a high level. When one of the non-reflecting surfaces goes into either reflective region, the associated light-receiving device furnishes an output of a low level. Since the interval between the end surfaces of the input fibers is set equal to $l(n \pm \frac{1}{4})$, the interval between the centers of the effective reflective regions also assumes a value of $l(n \pm \frac{1}{4})$. Accordingly, when the center of one of the reflective regions lies in the center of one of the non-reflecting surfaces, it follows that the center of the other reflective region is located at either end of one of the reflecting surfaces. The result is that the output waveforms from the light-receiving devices connected with their respective input optical fibers are 90 degrees out of phase.

Other objects and features of the invention will appear in the course of description thereof which follows.

BRIEF DESCRIPTION OF THE DRAWINGS

FIG. 2 is a waveform chart of the outputs from the rotary encoder.

DETAILED DESCRIPTION OF THE INVENTION

Figure 1:
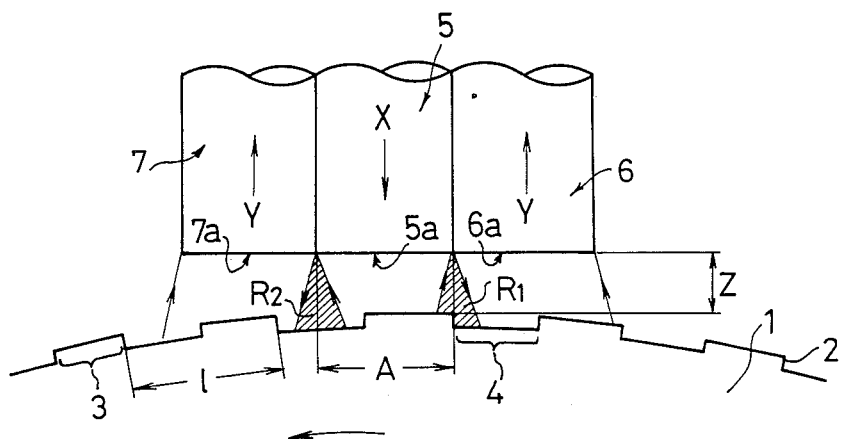
FIG. 1 is a front elevation of the main portion of a rotary encoder according to the present invention.

Referring now to FIG. 1, there is shown the main portion of a rotary encoder embodying the concept of the present invention as well as a rotating disk 1 with which the encoder is used. The disk 1 has reflecting surfaces 3 and non-reflecting surfaces 4 that are alternately formed on its periphery 2 with a certain pitch l. The encoder has an output optical fiber 5 and two input optical fibers 6 and 7 which are attached to the opposite sides of the output sides of the output fiber 5 in side-by-side relation. This output fiber 5 is connected to a light-emitting diode (not shown) and has one end surface 5a opposed to the periphery 2. Similarly, one end surfaces 6a and 7a of the input fibers 6 and 7, respectively, are disposed opposite to the periphery 2. These end surfaces 5a, 6a and 7a are firmly secured at a distance of Z from the reflecting surfaces 3 which are closest to them. The input fibers 6 and 7 are connected to their respective phototransistors (not shown). Now let A be the width of the end surface 5a of the output fiber 5. The interval between the end surfaces 6a and 7a also assumes a value of A, because the input fibers are attached to the opposite sides of the output fiber 5. This value is so set that the relationship $$A = l(n \pm \frac{1}{4})$$

holds, where n is a positive integer. The directions of propagation of light rays are indicated by arrows X and Y in FIG. 1.

In the operation of the rotary encoder constructed as described above, the light emitted from the end surface 5a of the output fiber 5 is reflected by one of the reflecting surfaces 3. The portion of the light which falls on an effective reflective region $R_1$ can impinge on the input fiber 6 after being reflected by the surface 3. Also, after light is radiated from the end surface 5a of the output fiber 5, some of the light which impinges on another reflective region $R_2$ can enter the input fiber 7 after reflected by one of the reflecting surfaces 3.

Now assume that the disk 1 is rotating in the direction indicated by the arrow shown in the figure. When the effective reflective region $R_2$ lies in the center of one of the non-reflecting sufaces 4, the left half and right half of the region $R_1$ are occupied by one of the reflecting surfaces 3 and one of the non-reflecting surfaces 4, respectively, because of $A = l\ (n \pm \frac{1}{4})$. Consequently, as shown in FIG. 2, the output waveform 9 from the light-receiving device connected to the input fiber 7 is 90° (B) out of phase with the output waveform 8 from the light-receiving device connected to the input fiber 6. In FIG. 2, pulse waveforms 8' and 9' are obtained by modifying the output waveforms 8 and 9, respectively.

As can be understood from the foregoing description, the novel rotary encoder where the input optical fibers are attached to the opposite sides of the output optical fiber and have their one end surfaces spaced apart a certain distance can readily deliver two output waveforms that are 90° out of phase, thereby permitting measurement of the revolution frequency. Further, it is possible to sense whether the disk is turning forward or rearward. In addition, the invention ensures that a rotary encoder exhibiting a high resolution can be easily manufactured.

While a preferred embodiment of the invention has been described using specific terms, such description is for illustrative purposes only, and it is to be understood that various changes and variations may be made without departing from the spirit and scope of the following claims.

What is claimed is:

1. A rotary encoder for use with a rotating disk which is to be examined and is provided with reflecting surfaces and non-reflecting surfaces that are alternately formed on the periphery of the disk with a certain pitch l, said encoder comprising:
    an output optical fiber connected to a light-emitting device and having an end surface opposed to the periphery of the disk, and
    two input optical fibers connected to their respective light-receiving devices and attached to the opposite sides of the output fiber, the input fibers having their one end surfaces opposed to the periphery of the disk,
    said end surfaces of the input fibers and said end surface of the output fiber being aligned and disposed in a common plane in the rotational direction of the periphery,
    the interval between said end surface of the input fibers being set equal to $l(n \pm \frac{1}{4})$, where n is a positive integer.

2. A rotary encoder as set forth in claim 1, wherein the light-receiving devices connected to the input fibers produce output waveforms that are 90 degrees out of phase.

* * * * *